United States Patent

Triandafilou

[11] Patent Number: 5,851,564
[45] Date of Patent: Dec. 22, 1998

[54] APPARATUS FOR FORMING A HOLLOW STRUCTURAL PROFILE

[76] Inventor: Jay S. Triandafilou, 66 Curzon Mill Rd., Newburyport, Mass. 01950

[21] Appl. No.: 736,291

[22] Filed: Oct. 24, 1996

[51] Int. Cl.⁶ .................................................. B29C 33/30
[52] U.S. Cl. .......................... 425/186; 249/51; 249/143; 249/144; 249/146; 249/164; 264/71; 264/333; 425/432; 425/468
[58] Field of Search .................................... 425/432, 468, 425/186; 264/71, 333; 249/51, 143, 144, 146, 164

[56] References Cited

U.S. PATENT DOCUMENTS

| | | |
|---|---|---|
| 411,027 | 9/1889 | Heindel . |
| 883,569 | 3/1908 | Rodgers ..................................... 249/51 |
| 892,592 | 7/1908 | Helm ......................................... 249/51 |
| 1,217,003 | 2/1917 | Janisch ..................................... 249/164 |
| 1,700,522 | 1/1929 | Underwood . |
| 2,057,018 | 10/1936 | Dillon . |
| 2,578,165 | 12/1951 | Bailey . |
| 2,718,382 | 9/1955 | Bird . |
| 3,166,871 | 1/1965 | Simison ..................................... 249/51 |
| 3,173,662 | 3/1965 | Millerbernd . |
| 3,655,842 | 4/1972 | Trautner . |
| 3,720,401 | 3/1973 | Loch et al. . |
| 3,933,969 | 1/1976 | Robinson et al. . |
| 3,975,250 | 8/1976 | Murphy . |
| 4,143,859 | 3/1979 | Tews . |
| 4,289,302 | 9/1981 | Montgomery . |
| 4,496,511 | 1/1985 | Virgili . |
| 4,519,586 | 5/1985 | Wilhelm et al. . |
| 4,602,765 | 7/1986 | Loper et al. . |
| 4,624,439 | 11/1986 | Aguilera ..................................... 249/51 |
| 4,756,861 | 7/1988 | Schultz . |
| 4,887,789 | 12/1989 | Harris et al. . |

Primary Examiner—Patrick Ryan
Assistant Examiner—Joseph Leyson
Attorney, Agent, or Firm—Pearson & Pearson

[57] ABSTRACT

An apparatus for making a lightweight, thin wall, seamless, hollow structural profile using a simple mold. The apparatus includes a base for supporting a mandril and a two piece outer form which bolts together assembled. A mixture is poured or injected into the space between the mandril and the form to produce a profile upon hardening of the mixture of either cement, fiberglass or polymers. The hollow area of the structural profile may be filled with various materials. The base comprises a plurality of upwardly rising columns or blocks and posts around the inside perimeter of the mandril and blocks around the outside perimeter of the form for proper positioning of the mandril and the form, which are separated by a predetermined distance in accordance with the desired features and dimensions of the structural profile.

5 Claims, 3 Drawing Sheets

APPARATUS FOR FORMING A HOLLOW STRUCTURAL PROFILE

BACKGROUND OF THE INVENTION

1. Field of the Invention

This invention relates to a mold for forming a structural profile having various unique features and in particular to an apparatus and method for making lightweight, seamless, hollow posts.

2. Description of Related Art

In the prior art fence posts have been made of wood or metal. Wooden fence posts are combustible and subject to rot. Wooden posts also require painting and other periodic maintenance, which is costly and time consuming. Metal fence posts often bend in use and if made of iron, require periodic painting.

Other fence posts have been made from concrete, and have been solid and/or hollow. For example, U.S. Pat. No. 1,700,522 issued Jan. 29, 1929 to W. Underwood discloses a mold construction having a core for forming cement columns or posts with a central longitudinal opening. The body of the mold is hollow having its interior finished or fashioned to give the desired design, shape or contour to the finished product. However, the present invention does not require a central core which remains in the finished product and becomes a cost element. Further, the structure produced by the mold is considerably heavy and thick wall whereas the present invention produces a lightweight, thin wall structure.

U.S. Pat. No. 3,933,969 issued Jan. 20, 1974 to Frank R. Robinson et al. discloses a wire reinforced hollow core concrete fence post made by injecting concrete into a form box having a centrally supported steel mandril. A removable wooden pallet board 18 is provided for insertion in the form box which may be smooth or have grooves at any desired spacing to form ridges on the exterior surface of a post. The mandril and wire mesh are rotated as the concrete is being injected into the form. The present invention does not involve the use of wire mesh for reinforcement, and therefore, does not require machinery involved with the rotation of the cylindrical mesh and the removable mandril.

SUMMARY OF THE INVENTION

Accordingly, it is therefore an object of this invention to provide a simple mold for making a lightweight, hollow, structural profile.

It is another object of this invention to provide a mold for making a thin wall, seamless, structural profile.

It is a further object of this invention to provide a low cost method for making a lightweight, hollow, structural profile.

It is still another object of this invention to provide low cost hollow structural profiles for use as posts, poles, columns, beams, supports, fence posts, piles and other structural components.

The objects are further accomplished by providing an apparatus for forming a hollow, seamless, structural profile comprising means for shaping an inside surface of the structural profile, means spaced a predetermined distance from the shaping means for forming an outside surface of the structural profile, base means for holding the shaping means and the forming means in a predetermined position, the shaping means being surrounded by the forming means and separated by the predetermined distance, and means poured between the shaping means and the forming means for solidifying into the structural profile. The base means comprises an inner arrangement of side blocks and corner posts for positioning the shaping means on the base means and an outer arrangement of side blocks for positioning the forming means on the base means the predetermined distance from the shaping means. The forming means comprises a first bracket section and a second bracket section, the first bracket section and the second bracket section abutting each other to surround the shaping means by the predetermined distance. The first bracket section and the second bracket section comprises bolting means at the top on each abutting side for securing together the first bracket means and the second bracket means. The base means including the solidifying means between the shaping means and the forming means is vibrated to achieve mixture consistency. The shape of the mandril means may be varied in accordance with a predetermined structural profile requirement. The inner surface of the forming means includes a design for transfer to the outer surface of the structural profile. The shaping means comprises a mandril.

The objects are further accomplished by providing a method of making a hollow, seamless, structural profile comprising the steps of placing a mandril in a vertical position on a base, the base having first block means for holding the mandril in position on the base, placing a form means on the base surrounding the mandril, the form means being spaced a predetermined distance from the mandril on all sides, the form means comprises a first bracket section and a second bracket section which abut each other to surround the mandril, pouring a solidifying means into the form means between the mandril and the form means, and removing the mandril and the form means from the base after the solidifying means has solidified forming the hollow, seamless structural profile. The step of placing the form means on the base comprises the steps of securing the first bracket section and the second bracket section of the form means positioned on the base by a plurality of block means attached to the base around the perimeter of the form means, and providing means on the first bracket section and the second bracket section of the form means at the top on each abutting side for bolting the sections together. The method further comprises the step of vibrating the base with the solidifying means between the mandril and the form means. The method comprises the step of adding color to the solidifying means. The method includes varying the shape of the structured profile by using a predetermined shaped mandril. The step of pouring the solidifying means comprises the step of pouring either a concrete mixture, a fiberglass mixture, or a polymer mixture. The method further comprises the step of providing a design on an inner surface of the forming means for transfer of such design to an outer surface of the structural profile.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
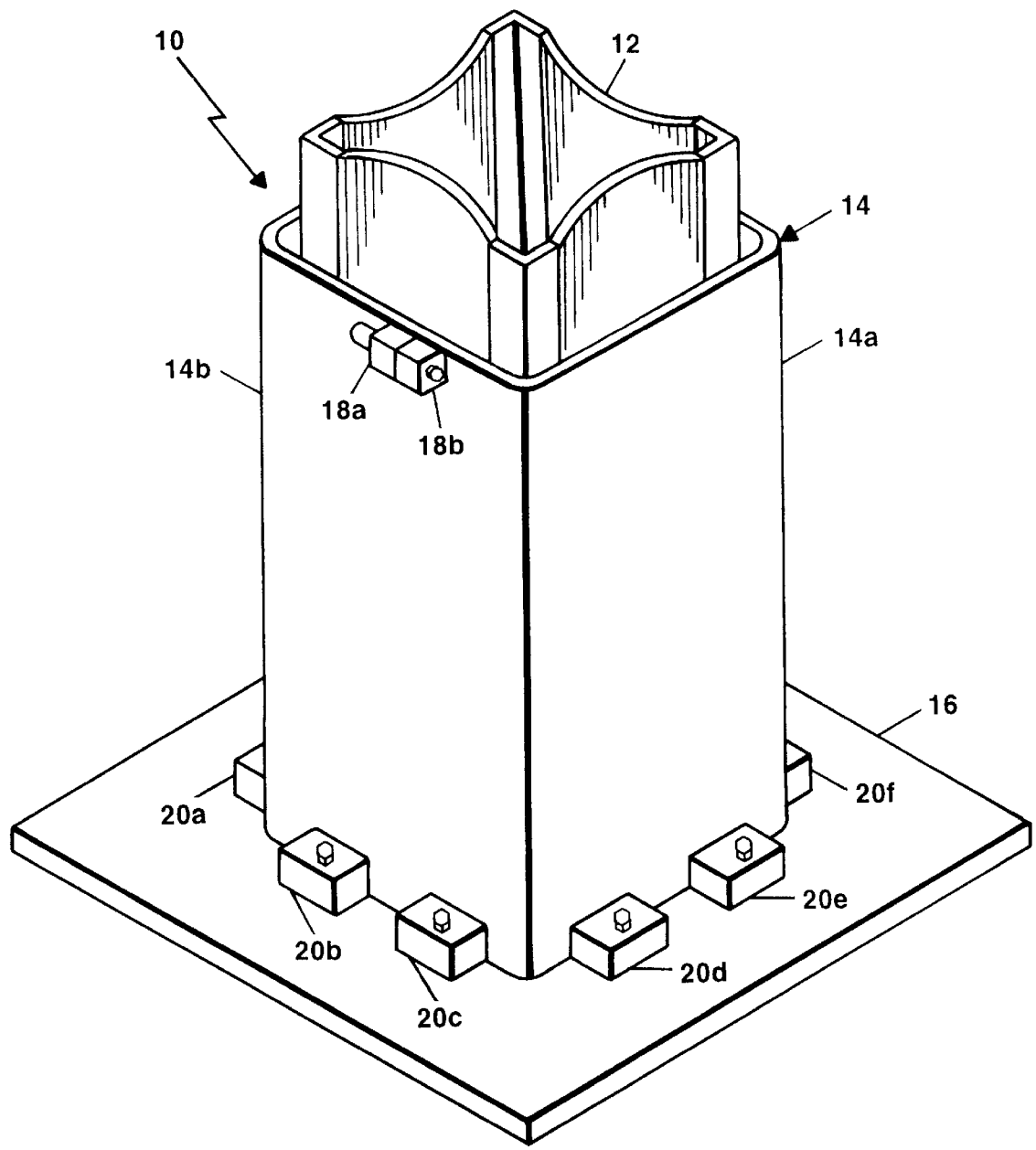
FIG. 1 is a perspective view of the invention for making a hollow structural profile showing the arrangement of guide blocks for receiving and securing a mandril and outer form in a base.

Referring to FIG. 1, a perspective view of the invention for forming a hollow structural profile 30 is shown such as for forming a lightweight, thin wall, seamless, hollow post. A mold 10 comprises a base 16 having a plurality of blocks 20a to 20h for positioning a form 14 to the base 16. The form 14 comprises two bracket sections 14a and 14b which are bolted together abutting each other in the mold 10 by upper attachment extenders 18a and 18b on one side of form 14 and attachment extenders 19a and 19b on an opposite side of form 14. Such a form 14 may comprise more sections depending on the size of the structural profile being made. A shaping means such as a mandril 12 is positioned within the outer form 14 and it is secured in the base 16 by inner blocks 22a to 22d and by corner posts 24a to 24d. The distance between the mandril 12 and the outer form 14 is determined by the specification for a particular structural profile 30 being molded or cast. The mandril 12 may have various shapes in accordance with the desired features of the hollow structural profile 10, one design of which is shown in FIGS. 1–3 wherein the sides are thicker across the middle of each side 30a to 30d.

Figure 2:
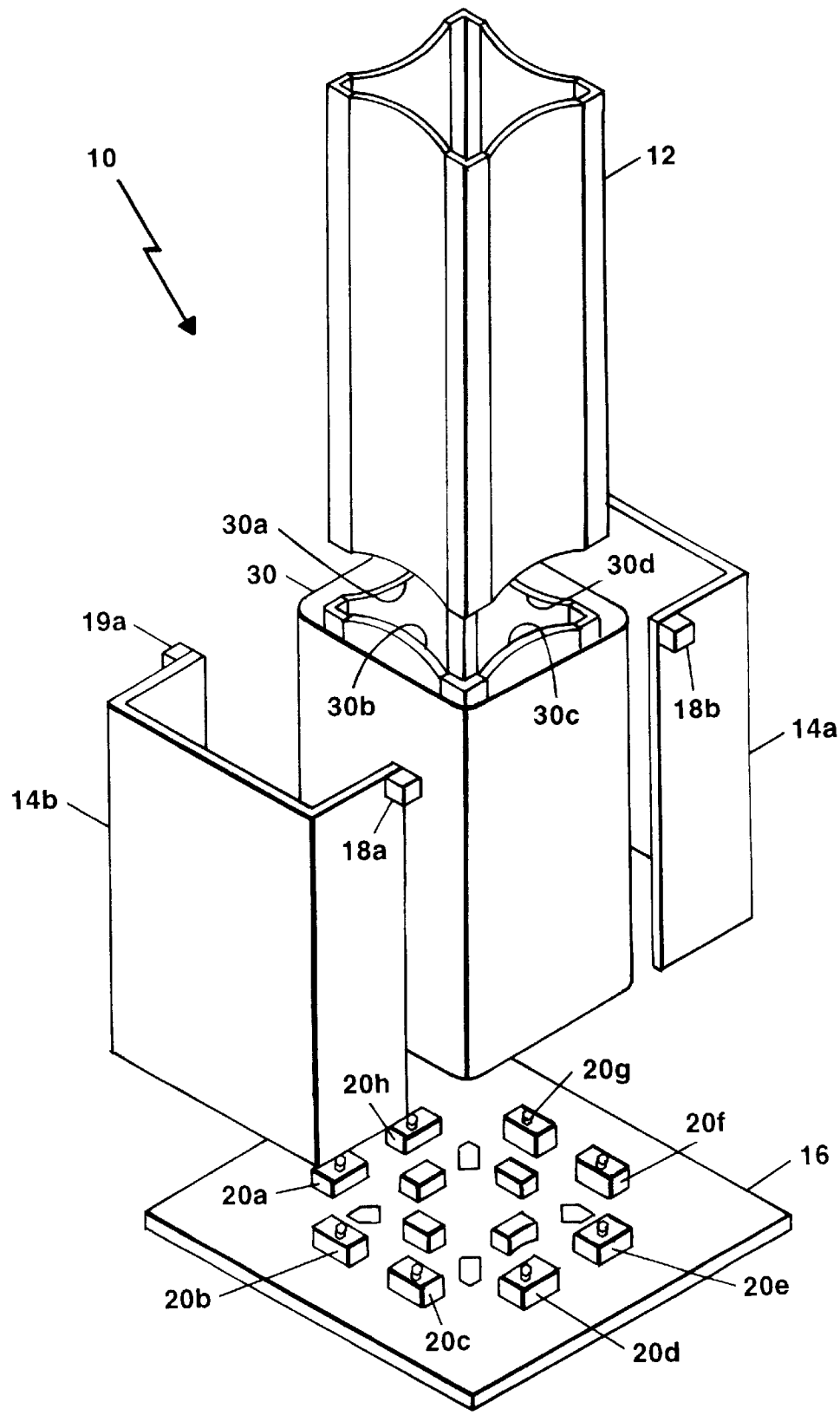
FIG. 2 is an exploded perspective of the invention showing a hollow, structural profile formed between the form and mandril combination when they are positioned and secured in the base.

Referring to FIG. 2, an exploded perspective view of the mold 10 is shown. A profile of the hollow post 30 is shown which is produced in the assembled mold 10 by pouring or injecting a mixture between the mandril 12 and the outer form 14; the mixture hardens to a solid profile. Such a mixture may be cement or cement composite or other appropriate state of the art mixtures such as fiberglass or polymers. The two bracket sections 14a and 14b are separated by removal of a bolt through upper extenders 18a and 18b and upper extenders 19a and 19b, and then lifted off the base 16. The mandril 12 may be lifted off the base 16 leaving the structural profile 30 which is easily removed.

Figure 3:
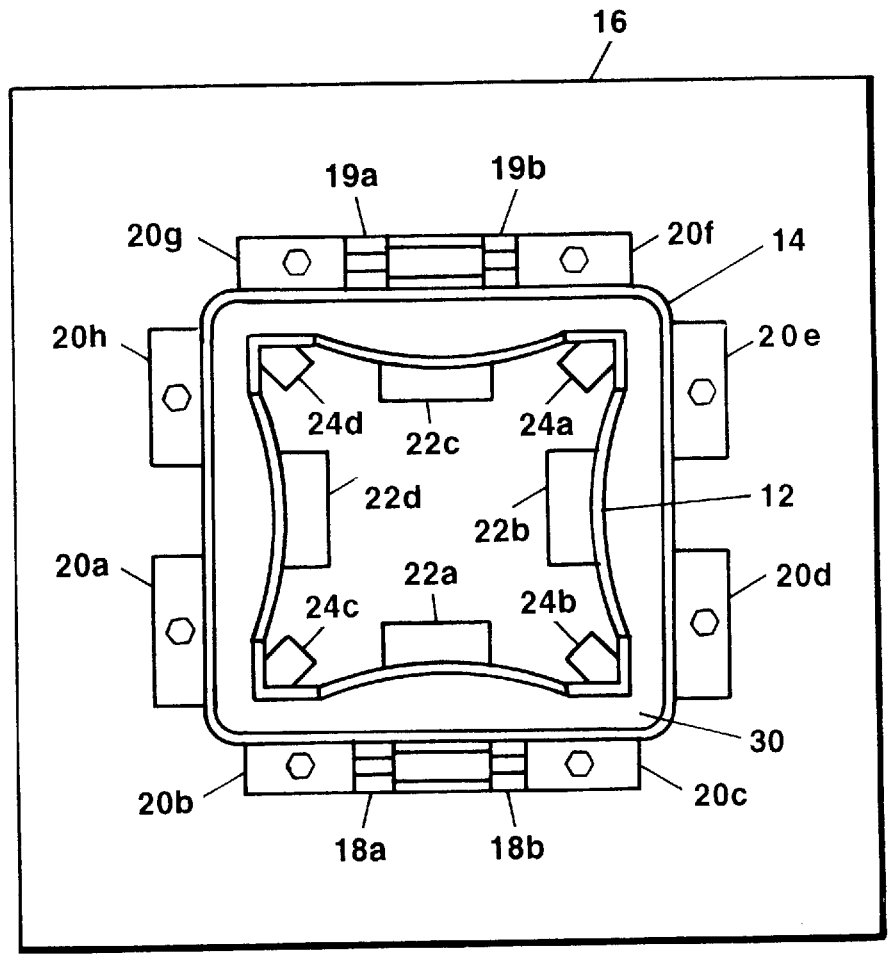
FIG. 3 is a top view of the invention showing the mandril and form secured in their positions by the guide blocks and corner posts.

Referring now to FIG. 3, a top view of the mold 10 is shown. The profile of a hollow structure or post 30 is produced between the mandril 12 and the form 14. The outside blocks 20a–20h hold the form 14 in position and the inside blocks 22a–22d and corner posts 24a–24d hold the mandril in position. The outside blocks 20a–20h are bolted into the base 16 which provides for easy removal, if necessary, to facilitate removal of the form bracket sections 14a and 14b. However, other methods of securing outside blocks 20a–20h may be used such as pinning with a wedge lock. The inside blocks 22a–22d and the corner posts 24a–24d may be secured to the base 16 by any suitable conventional technique which provides for ease of assembly/disassembly (i.e. bolting, pinning, welding clips and/or other suitable fastener). The simplicity of mold 10 provides a low cost means of producing the light weight, thin wall, seamless, hollow structural profile 30.

The hollow, structural profile 30 is intended to be used for posts, poles, columns, beams, supports, fence posts, piles, and other structural components. The profile 30 may be easily attached to fence sections, railings and/or brackets allowing for a broad spectrum of uses. Attachments allow various skirts and caps to be connected to the profile 30 giving the product a wide spectrum of aesthetic appearance. Basic exterior shapes of the profile 30 can be enhanced with various veneers and attachments. The thin wall construction and hollow shape provide for considerable weight and material savings without sacrificing structural integrity.

The method of making the structural profile 30 in mold 10 comprises the following stages:

A. PREPARING THE MOLD 10

The mold 10 is carefully cleaned including the mandril 12, the form 14 and the base 16. A releasing agent known to one of ordinary skill in the art is applied to the form 14 and mandril 12, and the form 14 (sections 14a, 14b) are assembled on the base 16 and the mandril 12 is inserted into the base 16.

B. PREPARING THE MIXTURE

A typical mixture comprises the following materials: Admix—20 oz., water 16 oz., structural skin 80 oz. The mixture must provide for proper slump and strength. The average slump is in the range of 3–5.

Ratios and dry times may vary depending on specific atmospheric conditions. The admix is added to the water and blended thoroughly. The water is added into the structural skin, blending while being added. The blending is done at a rate not to allow aeration. Color may be added at this stage, if desired.

C. POURING THE MIXTURE INTO THE MOLD 10

The mixture is poured or injected into the mold 10 between the mandril 12 and form 14. The mold 10 is attached to a vibration table and the mold 10 with mixture 30 is vibrated for a period of time to insure consistency of said mixture 30. The type of finish desired determines the vibration time. A smooth finish requires a longer vibration time. The mold 10 is then removed from the vibration table.

D. STORAGE OF THE MOLD 10

The mold 10 is placed in a dry area for a specific duration. It may be stored at ambient or at a controlled environment for accelerated durations.

E. MOLD 10 DISASSEMBLY

The mold 10 is disassembled by withdrawing the mandril 12 and unbolting the form sections 14a and 14b. The casting or solidified mixture 30 is removed from the base 16.

F. INSPECTION AND FINISHING

The casting or solidified mixture 30 is inspected and cleared of any obtrusive blemishes.

This invention has been disclosed in terms of certain embodiments. It will be apparent that many modifications can be made to the disclosed apparatus without departing from the invention. For example, various mixtures may be used for the structural profile 30 such as cement, fiberglass or polymer. Various size profiles 30 may be made by varying the length of the mandril 12 and form 14 and the predetermined space between the mandril 12 and form 14. Therefore, it is the intent of the appended claims to cover all such variations and modifications as come within the true spirit and scope of this invention.

What is claimed as new and desired to be secured by Letters Patent of the United States is:

1. Apparatus for forming a hollow seamless, structural profile comprising:

means for shaping an inside surface of said structural profile;

means spaced a predetermined distance from said shaping means for forming an outside surface of said structural profile;

said forming means comprises a first bracket section and a second bracket section, said first bracket section and said second bracket section, abutting each other to surround said shaping means by said predetermined distance, comprises bolting means at the top of each abutting side for securing together said first bracket means and said second bracket means;

base means for holding said shaping means and said forming means in a predetermined position, said base means comprises a plurality of adjustable fastening means for securing and easily removing said structural profile from said base means, said shaping means being surrounded by said forming means and separated by said predetermined distance, wherein said fastening means further comprises an inner arrangement of side blocks and corner posts for positioning said shaping means on said base means and an outer arrangement of side blocks for positioning said forming means on said base means said predetermined distance from said shaping means; and means poured between said shaping means and said forming means for solidifying into said structural profile.

2. The apparatus as recited in claim 1 wherein said apparatus includes vibrating means for vibrating said solidifying means between said shaping means and said forming means to achieve mixture consistency.

3. The apparatus as recited in claim 1 wherein said means for shaping comprises a design in accordance with a predetermined structural profile requirement.

4. The apparatus as recited in claim 1 wherein said forming means includes a design for transfer to the outer surface of said structural profile.

5. The apparatus as recited in claim 1 wherein said shaping means comprises a mandril.

* * * * *